United States Patent
Chang et al.

[11] Patent Number: 5,956,638
[45] Date of Patent: Sep. 21, 1999

[54] METHOD FOR UNLICENSED BAND PORT TO AUTONOMOUSLY DETERMINE INTERFERENCE THRESHOLD AND POWER LEVEL

[75] Inventors: Li-Fung Chang, Holmdel; Anthony Robert Noerpel, Long Branch, both of N.J.

[73] Assignee: Telcordia Technologies, Inc., Morristown, N.J.

[21] Appl. No.: 08/590,751

[22] Filed: Jan. 24, 1996

[51] Int. Cl.$^6$ .................................................. H04B 17/00
[52] U.S. Cl. ........................... 455/423; 455/513; 455/62; 455/67.1; 455/522
[58] Field of Search ..................................... 455/423, 444, 455/512, 513, 509, 450, 451, 452, 453, 454, 62, 63, 67.1, 67.3, 522; 370/445, 447

[56] References Cited

U.S. PATENT DOCUMENTS

| | | | |
|---|---|---|---|
| 5,203,012 | 4/1993 | Patsiokas et al. | 455/513 |
| 5,483,669 | 1/1996 | Barnett et al. | 455/62 X |
| 5,594,943 | 1/1997 | Balachandran | 455/513 X |
| 5,669,064 | 9/1997 | Iseyama | 455/69 X |

*Primary Examiner*—Wellington Chin
*Assistant Examiner*—Philip J. Sobutka
*Attorney, Agent, or Firm*—Joseph Giordano; David A. Hey; Elizabeth A. Mark

[57] ABSTRACT

Radio ports (RPs) in an unlicensed personal communications system adaptively, autonomously set their interference threshold and/or transmission power levels. This may be done by the RP measuring the signal level on each of the available channels and then setting the interference threshold and/or power level according to these measurements. In a preferred method, the interference threshold is determined by measuring the signal level on each channel, ranking the channels in order of measured signal level, and using these rankings to determine the threshold. The transmission power level may be set with reference to the adaptive interference threshold level. This level is determined by using the system and FCC power limitations and current conditions to provide a satisfactory transmission level.

7 Claims, 4 Drawing Sheets i = IDLE STATE
MEASURE = BOTH MEASURE AND SEEK STATES
Th = ADAPTIVE AUTONOMOUS LBT THRESHOLD MEASUREMENTS

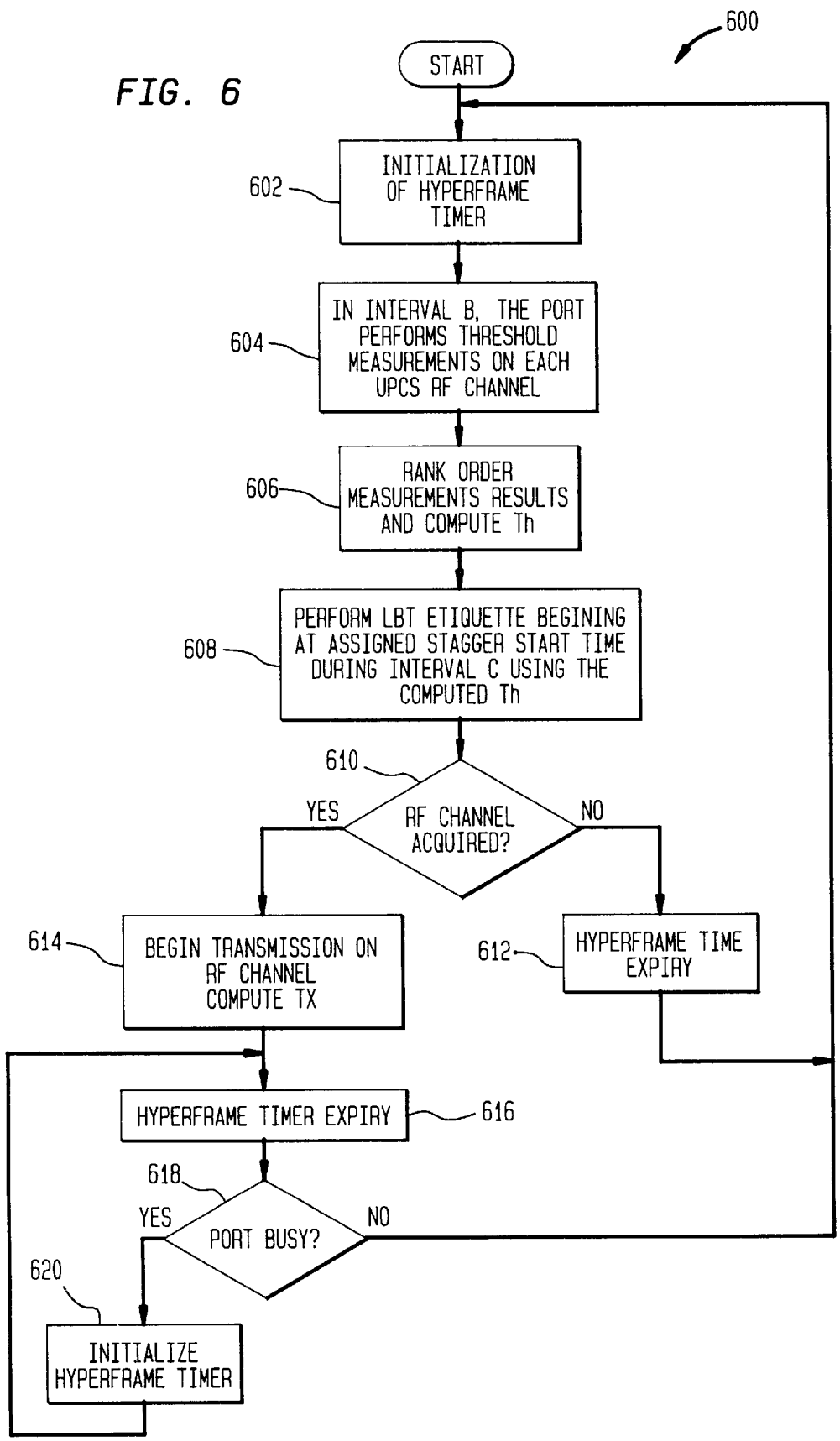

METHOD FOR UNLICENSED BAND PORT TO AUTONOMOUSLY DETERMINE INTERFERENCE THRESHOLD AND POWER LEVEL

RELATED APPLICATION

This application includes subject matter related to a co-pending application Ser. No. 08/590,997, filed Jan. 24, 1996, now U.S. Pat. No. 5,822,681, Oct. 23, 1998, entitled "Method for Assigning Band Port Frequencies In An Unlicensed Personal Communications System" invented by Li Fung Chang, Anthony Noerpel, Ashok Ranade, and Nelson Sollenberger and assigned to the assignee of the invention disclosed herein. The contents of this related application are incorporated herein by reference.

FIELD OF THE INVENTION

The present invention is directed to a wireless communication system and, more particularly, to a method for radio ports in the unlicensed personal communications spectrum to autonomously determine an interference threshold and transmission power level.

BACKGROUND OF THE INVENTION

The Federal Communications Commission (FCC) has designated the frequency band between 1920 and 1930 MHz as an unlicensed band for isochronous personal communications services (UPCS). This unlicensed band will be used primarily to support wireless telephone and circuit-switched data. The maximum permitted transmission power of 55 mW for 300 kHz bandwidth limits UPCS to indoor use, because the power level is too low for effective use outdoors.

FIG. 1 is an example of a simple UPCS system 50. A customer has a mobile terminal (MT) 52, such as a wireless telephone or key set, which is in wireless communication with a radio port (RP) 54 connected to a radio port control unit (RPCU) 56. A UPCS system may have a number of RPs 54 connected to the same or a different RPCU 56. The RPCU 56 may be connected to a communications network, such as an ordinary telephone line 58 which connects to a local switch 60. The switch connects to a telephone network, such as a public switched telephone network (PSTN) 62. The customer may have personal information, such as a telephone or personal communications number, call forwarding and routing information, account information, credit and billing information, and the like stored in a telephone network database, known as the Home Location Register (HLR) 64, servicing the customer's home area.

The 1920–1930 MHz band was previously allocated to licensed point-to-point microwave communication. The FCC has instituted strict requirements on the use of UPCS systems, at least until all of the point-to-point microwave systems are cleared from the band. It is expected that this clearing process may take as long as seven years. To this end, the FCC requires that UPCS components cannot transmit if they move outside of certain authorized areas. For this reason, it is generally believed that only large, geographically bound systems, such as Centrex and PBX systems may be used until the band is cleared. It also implicitly requires that the RP 54, not the MT 52 (which is capable of moving outside of authorized areas), must initiate communications.

Because the UPCS band is unlicensed, it is available for use without paying the FCC a license fee for each piece of radio equipment installed. To permit the band to be used fairly by a number of radio ports, such as RPs from unlike systems or from a number of service providers, within the same area, the FCC requires an etiquette for obtaining channels in the UPCS band. This etiquette is called the Listen-Before-Talk (LBT) etiquette.

In the LBT etiquette, each RP must find an available channel in the band on which to transmit. The FCC has divided the band into eight 1.25 MHz channels. "Narrow band" (e.g., less than 625 kHz occupied signal bandwidth) communications devices are required to begin searching for available channels at the lower 3 MHz of the band. "Wide band" communications devices are required to begin searching for available channels at the higher 3 MHz of the band. The following description will refer to narrow band communications devices, but the reader understands that it is equally applicable to wide band communications devices. Protocols in the UPCS spectrum may divide each 1.25 MHz channel into a number of system channels.

The RP 54 begins its search by measuring a first channel (e.g., randomly selected from the system channels contained in the bottom 3 MHz of the band) in the band to determine if interference below a threshold (the FCC requires the threshold to be no larger than 30 dB above a background level, except in special cases) is present. Interference above the threshold level indicates that the channel may already be taken by a nearby RP and is not available. The RP monitors the channel for the threshold level of interference for 10 ms before it can transmit, to make sure that another RP has not already acquired the channel. If the channel has interference beyond the threshold at any time during the 10 ms period, it searches the next higher channel. An RP must acquire the first channel it monitors and detects no interference above the threshold for 10 ms.

Once the RP 54 has acquired a channel, it is required to transmit immediately on that channel to "advertise" its availability for communications with an MT 52. If the RP 54 does not establish communication with an MT within that 30 second time period, the RP must relinquish the channel, and begin again its search for an available channel.

PACS-UB is a protocol which is adapted for use in the UPCS spectrum. The following description uses the PACS-UB protocol to illustrate the present invention. The reader understands, however, the principles of the invention apply to any protocol operable in the UPCS spectrum or that uses an LBT etiquette. The PACS-UB protocol meets the FCC UPCS requirements by using a "blinking beacon" protocol. This means that the RPs 54 transmit "beacon" signals that MTs 52 use to find RPs with which they can establish a communications channel. This "blinking beacon" is preferably accomplished using the PACS-UB hyperframe and superframe structures, illustrated in FIG. 2. FIG. 2 illustrates a preferred PACS-UB hyperframe 200 which comprises 30 one second superframes 202.

This arrangement satisfies the FCC requirement that an RP 54 may only hold a acquired frequency for 30 seconds, unless it establishes communication with an MT 52. These superframes 202 are system broadcast channel superframes (SBC-SF). One type of superframe is called an access superframe. An RP broadcasts an access superframe when it is attempting to acquire a channel. FIG. 2 shows an access superframe 202' in detail. The access superframe 202' is preferably divided into four phases 204, 206, 208, 210. These phases are:

1. a first 200 ms period 204 (phase A) during which an active RP 54 transmits incoming call alerts or short messages to the MT 52;
2. a second 200 ms period 206 (phase B) during which an active RP 54 transmits system and other service information;

3. a 400 ms period 208 (phase C) for idle ports to select a channel on which to transmit based on signal strength; and 4. a third 200 ms period 210 (phase D) during which the MTs 52 select an RP 54 having the best signal strength to which the MT has access rights (i.e., the MT is from the same system).

One problem with this etiquette is that a successful UPCS spectrum implementation having a large number of RPs should frame synchronize the RPs. This frame synchronization makes it likely that more than one RP will simultaneously monitor a channel for 10 ms and then acquire it, resulting in unacceptable co-channel interference. Once the synchronized RPs acquire the same channel, it is likely that they will continue to do so, rendering the ports relatively useless. To overcome this problem, it is proposed in the related application that radio ports be assigned "stagger start" times. This means that each RP begins its frequency search at a different time than nearby RPs. Thus, RPs that can detect each others transmissions do not begin their channel searches simultaneously. This avoids the adjacent port co-channel interference problem.

Another problem with the LBT etiquette is illustrated with reference to FIGS. 3 and 4. FIG. 3 is a histogram 300 showing an RP's signal level measurements of the channels in an illustrative PACS-UB protocol system in the UPCS spectrum at a period in time. PACS-UB further divides each of the eight 1.25 MHZ channels into four 300 kHz system channels, providing 32 total channels. A threshold level Th is used to determine whether or not a channel is available to an RP. If this threshold is set to a high level, such as $Th_1$ in FIG. 3, very noisy channels will be accepted resulting in suboptimal performance. In FIG. 3, a relatively noisy channel such as channel 2 is below the threshold. Because an RP must acquire the first channel it encounters having less than the threshold level of interference, a noisy channel such as channel 2 may be acquired even though much quieter channels, such as channels 9 and 11, are available. The FCC fixes a maximum level of 30 dB above a background noise level, which background level is about −118 dBm in a PACS-UB protocol system. However, this maximum level may be increased by up to 20 dB by reducing the RP's transmission power by a corresponding amount.

If the threshold level is set very low, such as $Th_3$ in FIG. 3, only very quiet channels will be selected. Few, if any, channels meeting this low threshold may be available, thus preventing RPs from finding an available channel. In FIG. 3, only channel 31 is below the $Th_3$ level. If several RPs are searching for channels and these RPs "hear" approximately the same signal levels as this RP, this channel may be acquired, leaving no channels available for this and other RPs.

Thus, an intermediate threshold level, such as $Th_2$, is desirable. In FIG. 3, at least 7 channels below this threshold level are available. Even this level, however, may not be optimal. The quietest channels are channel 9, 11, and 31. The RP will acquire the first available channel below the threshold. Here, this is channel 4. Channel 4 is about twice as noisy as channels 9, 11, and 31, and therefore less desirable. Moreover, the signal levels for the channels change over time with call arrivals and departures. At the point in time illustrated in FIG. 3, $Th_2$ may be the preferred threshold level. At another point in time, however, a different threshold level may be better for the signal levels measured at that time.

FIG. 4 is a chart 400 showing the number of times each of the 32 channels is selected in an illustrative PACS-UB system. As noted above, the LBT protocol requires an RP to select the first channel it encounters having less than the threshold level of interference for the 10 ms period. The LBT protocol also requires an RP to begin its channel search in the lower 3 MHz of the band and search upward until an available channel is found. (For wide band systems, the search begins in the higher 3 MHz of the band.) These two requirements result in the lowest frequency channels being acquired more often than the higher frequency channels (the converse is true for wide bandwidth systems). This is illustrated in FIG. 4. The curve labeled "actual" indicates how often channels are acquired in a relatively simple UPCS system. This curve shows that the lower channels are acquired much more often than the higher channels. This results in an inefficient use of the system resources. The ideal channel utilization distribution is uniform as seen in FIG. 4 by the line labeled "ideal": each channel is acquired as often as any other, making maximum use of all available channels.

To approach this ideal distribution, the threshold level should be adjusted to an appropriate level which is neither too high nor too low for the relevant conditions of the system. The relevant conditions, however—such as RP spacing, current UPCS spectrum usage, and local propagation conditions—vary from system to system and even from time to time within the same system. Moreover, the optimal threshold value may differ between RPs in the same system, and may vary for each RP over time as the relevant conditions change. Thus, it is difficult or impossible to select a single threshold value that will provide a channel distribution approaching the ideal at all times even for a single system.

The threshold level, in some instances, is related to the RP transmission power. The FCC has limited the maximum transmission power for devices operating in the UPCS spectrum.

This maximum power level is proportional to the square root of the transmission bandwidth. In the PACS-UB protocol, this maximum transmission power is about 17 dBm. The FCC allows the interference threshold to be increased from the 30 dB maximum, provided that the transmission power be decreased a corresponding amount below the maximum. For example, in a crowded, noisy environment, an RP may require an interference threshold of 35 dB. The FCC permits the threshold to be increased to this level, provided that the transmission power is reduced by 5 dBm. Thus, in the PACS-UB example discussed here, the maximum transmission power is reduced to 12 dBm.

In some instances, it is preferable to reduce the transmission power to reduce interference between RPs. This is illustrated in FIG. 5. FIG. 5 is a diagram illustrating one floor of a building 500 having a UPCS system. The building comprises three parts, an office suite 502, having a high density of RPs 54, a factory 504, having an intermediate density of RPs 54, and a warehouse 506, having a low density of RPs 54. The RPs' transmissions create coverage areas 508 which are indicated in FIG. 5 as a circle (or part of a circle). Preferably, the RPs 54 are arranged so that the entire area is covered by the coverage areas 508. Thus, an MT 52 will be in wireless communication with an RP 54 regardless of the MTs location in the building 500. In this example, to avoid unnecessary interference with nearby RPs, the coverage areas 508 in the office 502 cover less area than those in the factory 504 or the warehouse 506 (some coverage area overlap is preferred to prevent gaps in the RP coverage). Thus, the transmission power of the office 502 RPs 54 is lower than that of the RPs 54 in the factory 504 or the warehouse 506. Also, the transmission power of the RPs 54 in an area need not be the same. For example, in the warehouse 506 in this example, RP 54' has a higher transmission power than RP 54". In this instance, if the conditions affecting the interference threshold change, the interference threshold may change adaptively, and the transmission power should be able to change accordingly.

It is an object of the present invention to provide a method for adaptive, autonomous interference threshold level setting.

It is another object of the present invention to provide a UPCS system that effectively uses all available channels.

It is yet another object of the present invention to provide a method for adaptively, autonomously setting a transmission power level.

SUMMARY OF THE INVENTION

These and other objects are achieved by the present invention, which provides for a method wherein each radio port adaptively, autonomously sets its interference threshold and/or transmission power levels. This may be done, for example, by the RP measuring the signal level on each channel and then setting the interference threshold and/or power level according to these measurements.

In a preferred method, t he interference threshold is determined by measuring the signal level on each channel, ranking the channels in order of the measure d signal level, and using these rankings to determine the threshold. The transmission power level may be set with reference to the adaptive interference threshold. This level is determined by using the system and FCC power limitations and current propagation conditions to provide a satisfactory transmission level.

In one preferred embodiment, the equation for determining the interference threshold is:

$$Th=Min(50,RSSI_2+Max(2,RSSI_3-RSSI_2)-kTB)dB$$

where:

This the interference threshold;

$RSSI_n$ is the ranked RF energy (e.g., signal level) detected by a received signal strength indicator (RSSI), wherein the rank is from lowest to highest (e.g., $RSSI_2$ is the second lowest RF energy); and kTB is a background noise level.

In one preferred method, the equation for determining the transmission power with respect to the interference threshold is:

$$TX=Min(+TX_{max},Max(TX_{min},TX_{max}-(Th-30)))dB$$

where:

TX is the transmission power;

$TX_{max}$ is the maximum transmission power permitted by the FCC;

$TX_{min}$ is a system dependent minimum transmission power; and

Th is the interference threshold.

BRIEF DESCRIPTION OF THE DRAWINGS

The present invention is described with reference to the following drawings:

FIG. 6 is a flowchart of a preferred method of autonomously determining an interference threshold.

Figure 1:
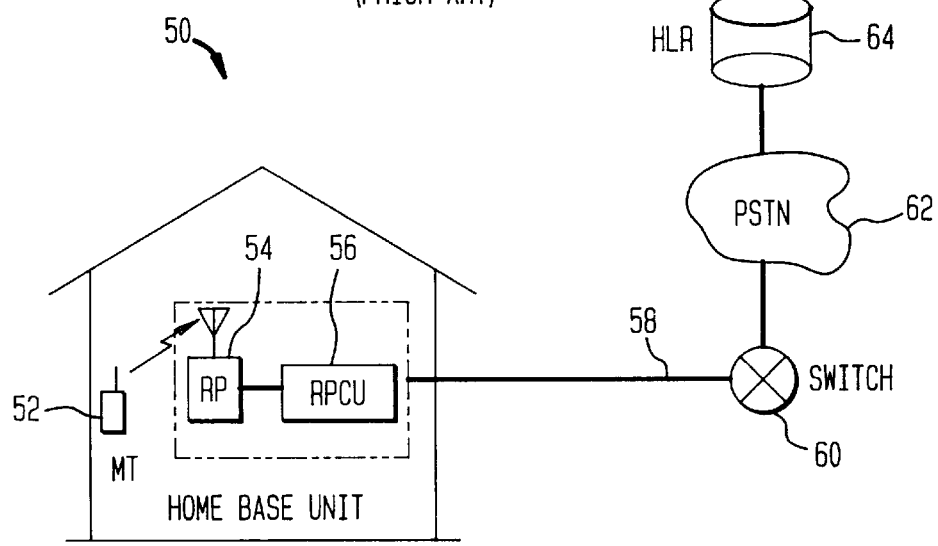
FIG. 1 illustrates an unlicensed personal communications system.
Figure 2:
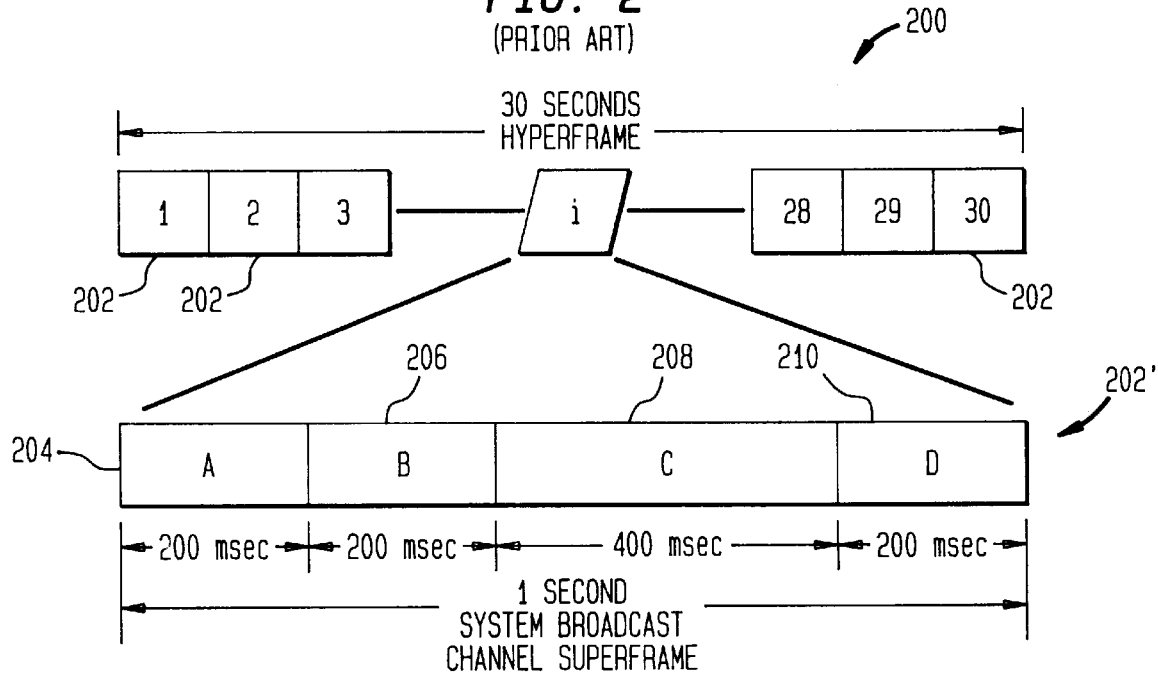
FIG. 2 illustrates a hyperframe/superframe structure of an illustrative PACS-UB system.
Figure 3:
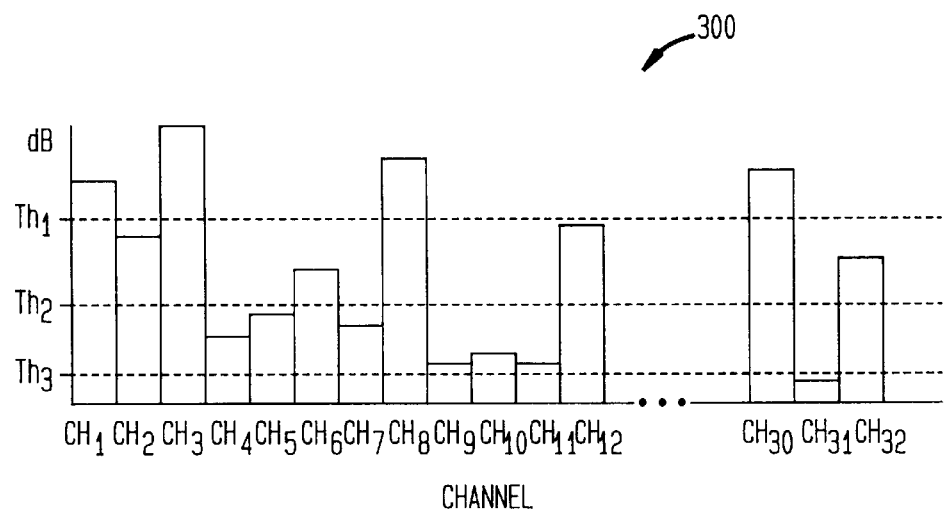
FIG. 3 is a histogram showing signal levels for channels is an illustrative PACS-UB system in the UPCS.
Figure 4:
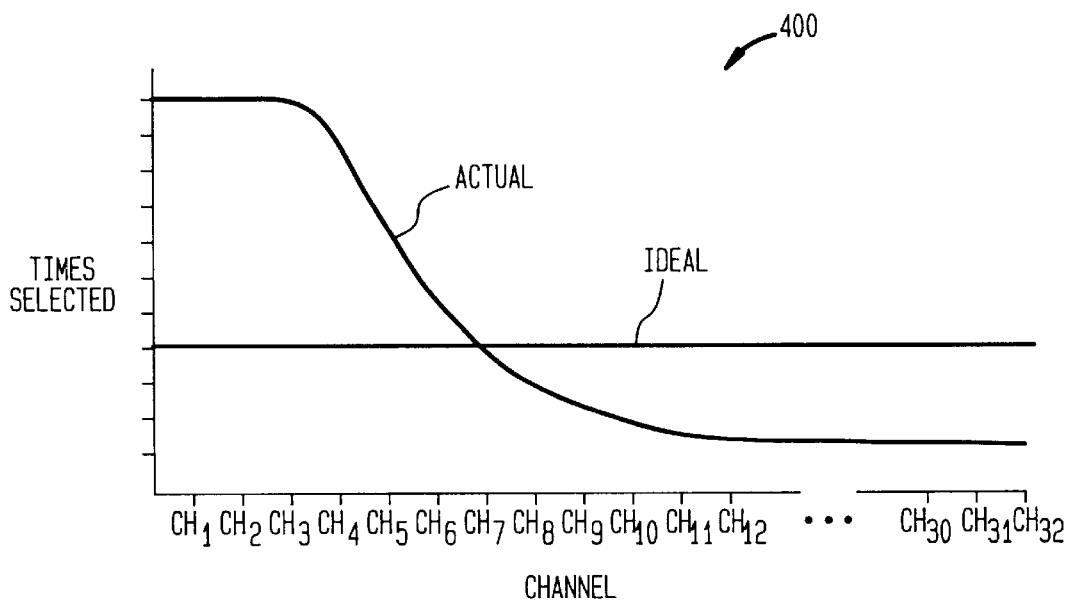
FIG. 4 is a chart showing the number of times each channel is selected by an illustrative PACS-UB system in the spectrum.

Attached as Appendix A is a glossary of acronyms used in this patent application.

DETAILED DESCRIPTION OF A PREFERRED EMBODIMENT

The present invention is a method for radio ports in a UPCS system to adaptively determine an interference threshold and/or transmission power level. This is preferably accomplished by measuring the signal strength on all of the channels and determining the threshold and/or level using these measurements.

The following detailed description relates to a PACS-UB protocol operating in the UPCS spectrum. The reader understands, however, that the invention is equally applicable to other protocols used with an LBT etiquette. Also, particular equations are disclosed. The reader understands that these equations are exemplary, and that other equations may also be used to accomplish effectively the inventive methods.

A. A Method For Adaptively, Autonomously Determining An Interference Threshold Level As discussed above, the optimal threshold value may differ between RPs in the same system, and may vary for each RP over time as the relevant conditions change. Thus, it is difficult or impossible to select a single threshold value that will provide a frequency distribution approaching the ideal at all times even in a single system. To solve this problem, a method for adaptively, autonomously determining an interface threshold level is provided. This allows each RP to choose a threshold value based on the channel signal levels at a particular moment in time. The LBT etiquette requires an RP to measure the signal levels on the channels in the band. In the preferred method according to the present invention, the RP measures the signal level it detects for all of the channels, ranks these channels in order of detected signal level, and uses these measurements to select an interference threshold level. The measurements may be taken by a received signal strength indicator (RSSI) in the RP used to measure the channel signal levels.

One possible equation for selecting the threshold level is:

$$Th=Min(50,RSSI_2+Max(2,RSSI_3-RSSI_2)-kTB)dB$$

where:

Th is the interference threshold;

$RSSI_n$ is the ranked signal level detected by a received signal strength indicator, wherein the rank is from lowest to highest (e.g., $RSSI_2$ is the second quietest channel); and kTB is a background noise level.

This equation means that the selected level will be the lowest of:

(1) the signal level of the second lowest channel plus the higher of:

(a) 2 dB; or (b) the difference between the signal levels of the third lowest channel and the second lowest channel; minus the background noise kTB; or (2) 50 dB (the FCC maximum threshold level permitted when the transmission power is reduced a corresponding amount) minus the background noise (kTB).

A person skilled in the art readily recognizes that any number of equations may be used to accomplish the objects of the present invention.

Each RP chooses an optimal threshold for the interference conditions it experiences. In this illustrative example, the threshold is chosen based on the second and third quietest channels (e.g., having the second and third lowest measured RF energies). For this equation, the threshold is always 2 dB higher than the level for the two best channels, to account for some inaccuracy or error in the measurement process. If the third best channel exceeds the level of the second best channel by less than 2 dB, the level is raised to that of the third best channel. Thus, if the two quietest channels are much quieter than the third quietest (e.g., more than 2 dB quieter), then the difference between the second and third quietest levels is added to the second quietest level. Otherwise a minimum amount of 2 dB is added to the second quietest level.

FIG. 6 is a flow chart 600 illustrating the inventive method for determining the interference threshold. In FIG. 6, an RP is operating within the PACS-UB protocol and is using the "stagger start" method described in the related application referred to above. The method begins by initializing the hyperframe timer (step 602). At a predetermined time, such as the last 40 ms of an RP's access superframe phase B 206, the RP measures the signal levels of each channel in the UPCS spectrum (step 604). If there are 32 channels, and all channels are measured in a total of 40 ms, then each channel is monitored for 1.25 ms. These 32 measurements give the RP an overview of the interference levels it detects in the band. Using these measurements, the channels are ranked in order of signal level and the threshold interference level is determined (step 606).

Once the threshold interference level is determined, the RP performs the LBT etiquette during superframe phase C according to the RPs' assigned stagger start time and using the determined threshold (step 608). During the LBT etiquette channel search, the RP monitors a channel to determine if it is available to acquire. If it detects interference above the threshold interference level before 10 ms has expired, it abandons that channel and monitors the next channel. If it does not detect interference above the threshold level for the entire 10 ms period, it acquires that channel and immediately transmits on it.

If an RF channel is not acquired (step 610) (e.g., no channel has a signal level below the threshold), the hyperframe timer expires (e.g., 30 seconds) and the process begins again (step 612). If a channel is acquired (step 610) (e.g., the RP acquired the first channel having a signal level below the threshold), the RP begins transmitting (e.g., "advertising" its availability to MTs) on the acquired channel (step 614).

At the end of the hyperframe (step 616), if the RP is not communicating with an MT (step 618), it relinquishes the channel and begins the process again. If the RP is communicating with an MT (step 618), the hyperframe timer is re-initialized (step 620) until the RP is no longer communicating with an MT.

Figure 7:
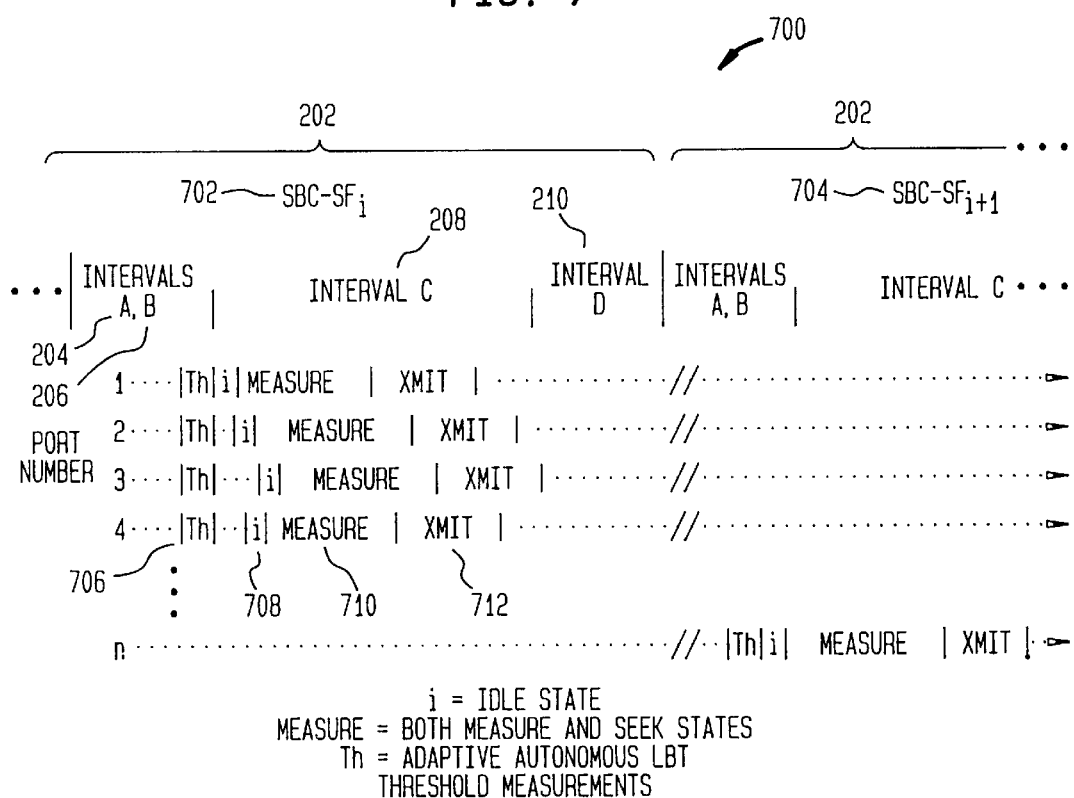
FIG. 7 is a timing diagram illustrating a preferred method of autonomously determining interference threshold.

FIG. 7 is a timing diagram 700 illustrating the inventive method for determining the interference level. FIG. 7 illustrates a system having n RPs using a PACS-UB protocol and performing both the "stagger start" method described in the related application and the method of the present invention. In this illustration, the stagger start times have already been assigned and the RPs have been operating. In this figure, two superframes 202 are shown: SBC-SF$_i$ 702 and SBC-SF$_{i+1}$ 704. In the first superframe SBC-SF$_i$ 702, RP$_1$ is assigned the first stagger start interval, RP$_4$ is assigned the second, RP$_2$ is assigned the third, and RP$_3$ is assigned the fourth. RP$_n$ is assigned a stagger start in phase C 208 of the next superframe SBC-SF$_{i+1}$. That is, SBC-SF$_{i+1}$ is RP$_n$'s access superframe. At the end of phase B 206, each RP that has its stagger start in that superframe 202 (e.g., the RPs which have this superframe as their access superframe) performs the inventive method during the interval indicated "Th" 706. In this preferred PACS-UB embodiment, the Th interval 706 is the last 40 msec of superframe phase B 206. The RP having the first stagger start time (here RP$_1$) begins its channel search by measuring the RF energy on these channels during the "measure" interval 710. After a brief idle time, indicated with "i", 708, the other RPs having stagger start times begin their frequency searches. The idle time 708 is the time between the beginning of phase C and the beginning of an RP's stagger started frequency search. Thus, the idle time for the RP having the first stagger start time is zero. During the "measure" interval 710, the RP uses the adaptive interference level determined during the "Th" interval 706 to acquire, the first channel which, after being monitored for 10 ms, does not have a signal level above the threshold. After a frequency is acquired, the RP "advertises" its availability for communications with MTs 52 during an "Xmit" interval 712. Each RP performs the "measure" and "Xmit" intervals 710, 712 according to the assigned stagger start time.

Figure 5:
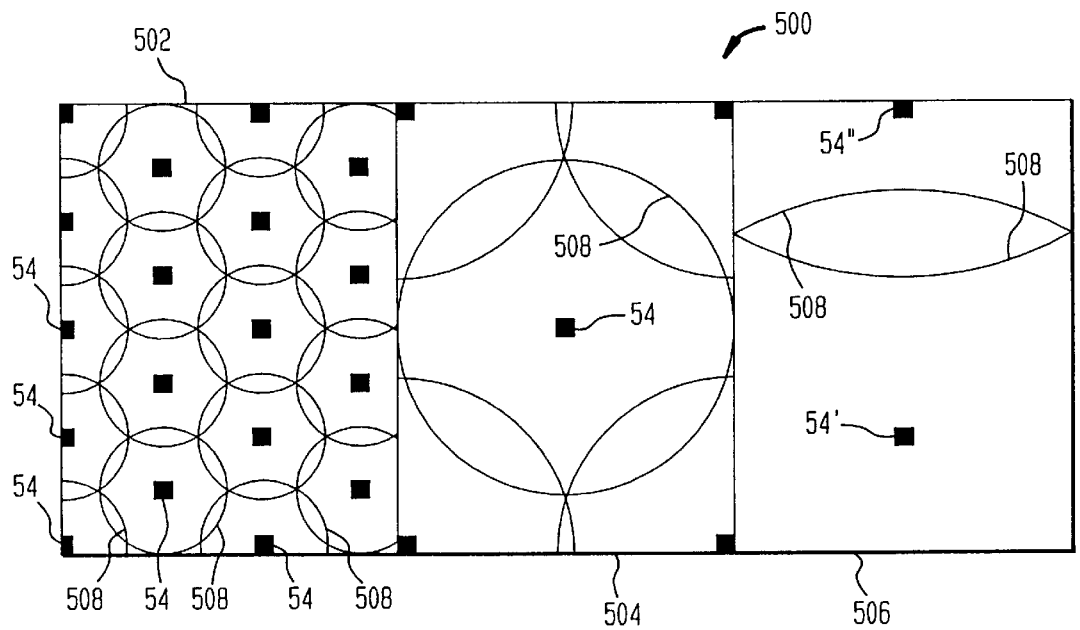
FIG. 5 is a diagram illustrating one floor of a building having a UPCS system.

B. A Method For Determining The Transmission Power Based On An Adaptive, Autonomous Interference Threshold Level In applications where there are a number of competing systems in the same area, it is preferable for the transmission power level to be reduced proportionally to the interference threshold. This is because the competing systems are unlikely to be "stagger started" together. This results in direct competition for channels and an increased likelihood of co-channel interference. In FIG. 5, the transmission power of the RPs in the office 502 is reduced to minimize the overlap between coverage area 508. The reduced coverage area results in a reduced likelihood of interference with nearby RPs from different systems which are not stagger started in relation to the RP and are competing for channels.

In one preferred method, the equation for determining the transmission power with respect to the interference threshold is:

$$TX = Min(+TX_{max}, Max(TX_{min}, TX_{max-(Th-30)}))dBm$$

where:

TX is the transmission power;

$TX_{max}$ is the maximum transmission power permitted by the FCC;

$TX_{min}$ is a system dependent minimum transmission power; and

Th is the RP's interference threshold.

In this equation, the transmission power is determined to be the lower of either:

(1) the higher of:

(a) a system dependent minimum transmission level; or (b) the FCC maximum transmission power level minus the amount the interference threshold was raised above 30 dB; or (2) the FCC maximum transmission power.

A person skilled in the art readily recognizes that any number of equations may be used to accomplish the objects of the present invention.

The present invention is not limited to the disclosed methods, but rather various modifications, substitutions, equations, and methods may be used without departing from the scope of the present invention.

We claim:

1. A method for determining an interference threshold in a communication system having a number of channels and employing a listen-before-talk etiquette, the method comprising the steps of measuring an RF energy level on each channel; and selecting the interference threshold based on these measurements, wherein the step of selecting comprises selecting the interference threshold according to:

$$Th=Min(50, RSSI_2+Max(2,RSSI_3,-RSSI_2)-kTB)db$$

Where:
Th=the interference threshold;
$RSSI_2$=is a second lowest measured Rf energy level;
$RSSI_3$=is a third lowest measured Rf energy level; and
kTB=is a background RF energy level.

2. The method of claim 1, wherein the step of measuring further comprises ranking each channel according to the measurements, and the step of selecting further comprises selecting the interference threshold based on this ranking.

3. The method of claim 1, wherein the step of measuring comprises measuring the received signal strength of each channel.

4. A method for determining a transmission power for a radio port in a communications system using a listen-before-talk etiquette, comprising the set of determining the transmission power according to:

$$TX=Min(+Tx_{MAX},Max(TX_{MIN},TX_{MAX}-(Th-30)))$$

Where:

TX=is the determined transmission power;
$Tx_{MAX}$=is a maximum transmission power;
$TX_{MIN}$=is a minimum transmission power; and
Th=is a interference threshold.

5. In a radio communication system having a number of radio ports and a number of channels over which each of said radio ports may transmit, a method for each radio port autonomously to set its interference threshold for selecting one of said radio channels and for autonomously setting its transmission power comprising the steps of measuring an RF signal level on each of said channels for one of said radio ports;

based on said measuring selecting the interference threshold for said one radio port according to $$Th=Min(50,RSSI_2+Max(2,RSSI_3-RSSI_2)-kTB)db$$

where
Th=the interference threshold;
$RSSI_2$=a second lowest measured RF energy level;
$RSSI_3$=a third lowest measured RF energy level; and
kTB=a background RF energy level; and determining the transmission power according to $$TX=Min(+TX_{MAX},Max(TX_{MIN},TX_{MAX}-(Th-30)))$$

where
TX=the determined transmission power;
$TX_{MAX}$=a maximum transmission power; and
$TX_{MIN}$=a minimum transmission power.

6. The method in accordance with claim 5 wherein the system uses a listen-before-talk technique.

7. The method in accordance with claim 6 further comprising ranking each channel according to said measurements for said one radio port, said step of selecting being based on said ranking.

* * * * *